(12) United States Patent
Wolfcarius et al.

(10) Patent No.: US 8,775,032 B2
(45) Date of Patent: Jul. 8, 2014

(54) AGRICULTURAL MACHINE WITH VARIABLE RPM CONTROL

(75) Inventors: Nico J. M. Wolfcarius, Wakken (BE); Ward M. R. Byttebier, Zwevegem (BE)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 13/392,670

(22) PCT Filed: Aug. 30, 2010

(86) PCT No.: PCT/EP2010/062639
§ 371 (c)(1),
(2), (4) Date: Feb. 27, 2012

(87) PCT Pub. No.: WO2011/026807
PCT Pub. Date: Mar. 10, 2011

(65) Prior Publication Data
US 2012/0151891 A1   Jun. 21, 2012

(30) Foreign Application Priority Data
Sep. 1, 2009   (BE) .................................. 2009/0534

(51) Int. Cl.
*G06F 7/70* (2006.01)
(52) U.S. Cl.
USPC .......................................................... 701/50
(58) Field of Classification Search
USPC .......................................................... 701/50
See application file for complete search history.

(56) References Cited

U.S. PATENT DOCUMENTS

| 4,715,258 | A | 12/1987 | Shigematsu et al. |
| 5,545,106 | A | 8/1996 | Senger et al. |
| 6,144,910 | A * | 11/2000 | Scarlett et al. ................. 701/50 |
| 6,937,931 | B2 * | 8/2005 | Funato et al. .................. 701/54 |
| 7,213,389 | B2 * | 5/2007 | Teijido et al. .................. 56/10.8 |
| 7,774,117 | B2 * | 8/2010 | Ozawa et al. .................. 701/54 |
| 8,230,667 | B2 * | 7/2012 | Finkler et al. ............. 56/10.2 A |
| 2009/0118912 | A1 * | 5/2009 | Hugenroth et al. ............ 701/50 |

FOREIGN PATENT DOCUMENTS

EP    2223588 A2    9/2010

* cited by examiner

*Primary Examiner* — Thomas B Will
*Assistant Examiner* — Joel F. Mitchell
(74) *Attorney, Agent, or Firm* — Patrick M. Sheldrake

(57) ABSTRACT

The present invention relates to a self-propelled agricultural machine, comprising:
  elements (5) for gathering and/or processing crops;
  an engine (1) operable to travel the machine through a first driving mechanism (3) and to drive the operation of said elements through a second driving mechanism (4); and
  a control unit (6) for controlling engine RPM,
  characterized in that the control unit (6) is configured for controlling the engine RPM ($n_i$) on the basis of a target RPM (ns), which is in turn based on an assessment of the imposed engine load (Ti), wherein in at least in one sub-range between 0% and 100% of the maximum load, the target RPM is a constantly rising function of said engine load. The present invention relates also to a method of controlling the RPM of the engine.

10 Claims, 4 Drawing Sheets

AGRICULTURAL MACHINE WITH VARIABLE RPM CONTROL

FIELD OF THE INVENTION

The present invention relates to agricultural machines such as combine harvesters or forage harvesters, provided with an engine driving the machine and operating its crop-processing parts, such as cutting drums and blowing fans.

STATE OF THE ART

The aforementioned machines traditionally operate at high fixed RPM, a variable, usually a hydrostatic, drive being provided for the control of the travel speed. The high, fixed engine RPM is maintained in order to ensure homogeneous processing of the crops and also in order to absorb load fluctuations without the crop flow through the machine becoming jammed. This way of operating does, however, lead to a high consumption of fuel and to the generation of a high level of noise by the machines. In many situations, for example when the machine is at a standstill, when it is travelling on flat ground, or when the crop-processing elements are immobilised, the load is low and engine efficiency diminishes when the machine is running at high RPM.

A number of documents already describe this problem and propose numerous solutions, as follows.

EP-A-1236389 describes a machine wherein the (constant) RPM at which the engine is running can be set by the operator within the limits of the sub-range of the total RPM range. The former may depend on different parameters, such as the quantity of crops, or the preset engine parameters, this taking place on the switch to running at a constant RPM. The operator sets the RPM and there can accordingly be no automatic RPM reduction when the load decreases. The present document describes a system in which the range wherein the operator can set the RPM changes automatically, according to circumstances.

EP-A-1609349 describes a machine wherein the engine RPM is controlled as a function of a measurement of crop throughput. The drawback is a complex set-up with different sensors for measuring throughput.

GB-A-2205179 describes a system wherein the engine shaft torque is measured and serves as input of a system to control the engine speed, allowing said speed to fall or to rise depending on load. The adjustment of RPM only takes place when torque fluctuation has exceeded a given threshold value, the crop-processing elements being maintained at constant RPM by means of speed converters. In one particular embodiment of the invention, use is made of an indirect modification of RPM in cases where a central gear transmission is used.

EP-A-1658765 describes a machine wherein the engine RPM is controlled by the measurement of external parameters such as the height or the throughput of the crop. If said measurements yield the required information, the engine RPM is raised from "low load" to "high load". Since said measurements can be made sufficiently early on, the control has sufficient time to set the RPM rapidly enough and a rise of RPM can be implemented sufficiently early on. Once again, the drawback is the need for complex sensors.

EP-A-2057881 describes a machine running at various fixed values of RPM depending on the load being measured on the engine shaft, the speed of the crop-processing elements being kept constant. No details are given concerning the transition between different values of RPM.

SUMMARY OF THE INVENTION

The present invention provides a solution of the aforementioned problems using the control to be provided and described in the appended claims.

The present invention concerns a self-propelled agricultural machine, such as a combine harvester, or a forage harvester comprising:
  elements for gathering and/or processing crops;
  an engine operable to travel the machine through a first driving mechanism and to drive the operation of said elements through a second driving mechanism; and
  a control unit for controlling engine RPM,
  characterised in that the control unit is configured for controlling the engine RPM on the basis of a target RPM, which is in turn based on an assessment of the imposed engine load, wherein in at least in one sub-range between 0% and 100% of the maximum load, the target RPM is a constantly rising function of said engine load.

The imposed engine load is preferably derived from a measurement of engine RPM and of fuel consumption, for example by the control unit (ECU) of the engine itself.

According to a preferred embodiment of the present invention, the rate of change of the target RPM within said sub-range is itself a rising function of the extent to which the imposed load respectively exceeds the sub-range upper limit or undershoots the sub-range lower limit.

According to an embodiment of the present invention, the control unit is configured for keeping the RPM equal to a constant target value within two or more non-overlapping sub-ranges of the total load range, the lowest sub-range beginning at 0% of said total load range, and wherein:
  said constant target value is lowest for the lowest of said sub-ranges and rises for higher ranges;
  in the transition zone between the sub-ranges of constant target value, the target RPM is a continuously rising function of the engine load, as stated in claim 1.

The difference between the constant target values of two neighbouring sub-ranges can be constant. Setting means can be provided enabling the machine operator to set engine RPM corresponding to a sub-range having a constant setting value, or an RPM between two sub-ranges with a continuously rising target value.

Said total range can advantageously comprise:
  a transition zone between a medium and a high load range, where the control unit raises the target RPM continuously to a maximum value;
  a high load range where the control unit keeps the target RPM at maximum value and the current RPM of the engine is determined by the torque curve of said engine.

At full machine load, for example in order to achieve full harvesting capacity, this enables high engine RPM, whilst another element of the control unit varies the travel speed of the machine, in order to keep the load at its present level.

According to an embodiment of the present invention, said range is divided up as follows:
  a low load range where RPM remains at a constant target value;
  a medium load range where the target RPM is a continuously rising function of the load;
  a high load range where the current RPM is determined by the torque curve of the engine; and
  a transition zone between medium and high load ranges where the target RPM is a continuously rising function of the load.

According to another embodiment of the present invention said range is divided up as follows:

a low load range where RPM remains at a constant target value;

a medium load range where the RPM remains at a constant target value which is higher than the target value of the low load range;

a high load range where the RPM is determined by the torque curve of the engine; and transition zones respectively between low and medium load and between medium and high load where the target RPM is a continuously rising function of the load.

The present invention also relates to a method of controlling the RPM of a machine according to the invention, wherein the method comprises the following steps:

assessing the imposed engine load; and setting the RPM in accordance with the imposed engine load and in accordance with a curve providing the target RPM as a function of the load, wherein said curve comprises at least one sub-range of the total range between 0% and 100% of the maximum load and wherein the target RPM is a continuously rising function of the engine load.

According to the method of the present invention, the rate of change of the target RPM in said sub-range is itself a rising function of the extent to which the imposed load respectively exceeds the sub-range upper limit or undershoots the sub-range lower limit.

DETAILED DESCRIPTION OF PREFERRED EMBODIMENTS

Figure 1:
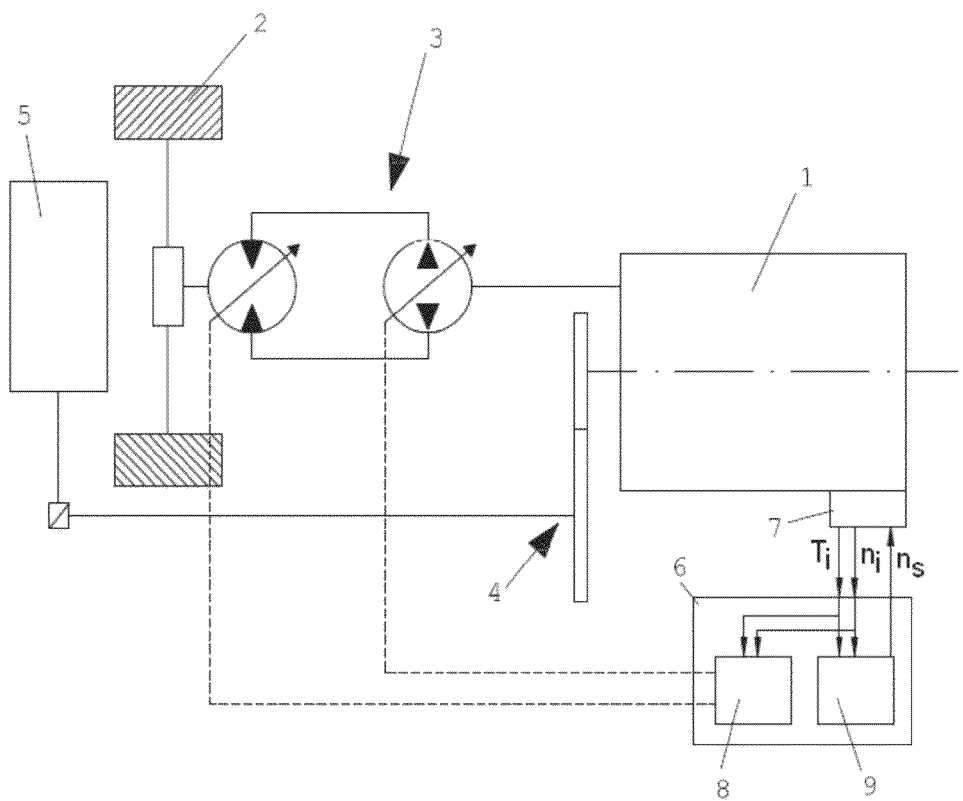
FIG. 1 is a schematic view of the main components of a machine according to the present invention.

FIG. 1 is a schematic representation of a number of components of the machine to which the invention refers. The internal combustion engine 1 drives the wheels 2 of the machine via a hydrostatic drive 3. The crop-processing components 5 such as cutting drums, feed rollers, blower and the like in the case of forage harvesters, are driven by a mechanical drive 4 consisting of, for example, gears and/or belt drives. Said drives are not shown in detail here and can be constructed according to the state of the art.

A control unit 6 is also shown schematically. Control unit 6 can be embodied by a programmable electronic module according to the state of the art. It is preferably a control unit linked to the engine control unit 7 (ECU). The ECU is a control module commonly present on contemporary engines, which provides a number of signals during engine operation, indicative of parameters such as fuel consumption, engine RPM ($n_i$), as well as derived parameters such as current power, or the current percentage of maximum available power or engine torque ($T_i$) (on the basis of curves or tables pre-programmed into the ECU). Control unit 6, sometimes called in the art 'Vehicle Control Module' ('FCM' in forage harvesters), assesses the operating state of the machine on the basis of said parameters. A module 9 of the FCM 6 calculates the setting value of RPM ($n_s$) and transmits the necessary control data to ECU 7 in order to command the engine to run at the set RPM value. The present invention concerns a method of controlling the RPM of the engine of the machine, as well as an agricultural machine wherein the control unit 6 is programmed to control the engine according to said method.

Another module 8 of FCM 6 controls the travel speed of the machine through control of the elements of a hydrostatic drive. In a certain work mode (PowerCruise) this module uses the data of current RPM $n_i$ and load $T_i$ for calculating the power currently delivered, and, on the bases of the result, modifying the travel speed of the machine according to the load of engine 1. This mode is used during harvesting in order to have the machine running as much as possible at its maximum load. The power offtake depends partly on the power needed for the travel of the machine, but primarily on the power needed for harvesting and processing the crop. The power needed rises and falls according to the quantity of crop being processed per unit of time (T/h) and hence to the travel speed of the machine. Variations of the local density of crops in the field (T/ha), or of the width (m) over which the header harvests the crop, also influence crop throughput and cause engine power variations. A controller in the FCM will compensate these variations by adjusting the travel speed of the machine, so that the quantity of crop per unit of time shall remain stable and the required power remains as close as possible to the available maximum of engine power.

The control unit according to the present invention is configured to rotate the engine at a target RPM $n_s$ which in at least one sub-range of the torque or power range of the engine will be a continuously rising function of the imposed engine load (expressed as the imposed engine torque or power).

Figure 2:
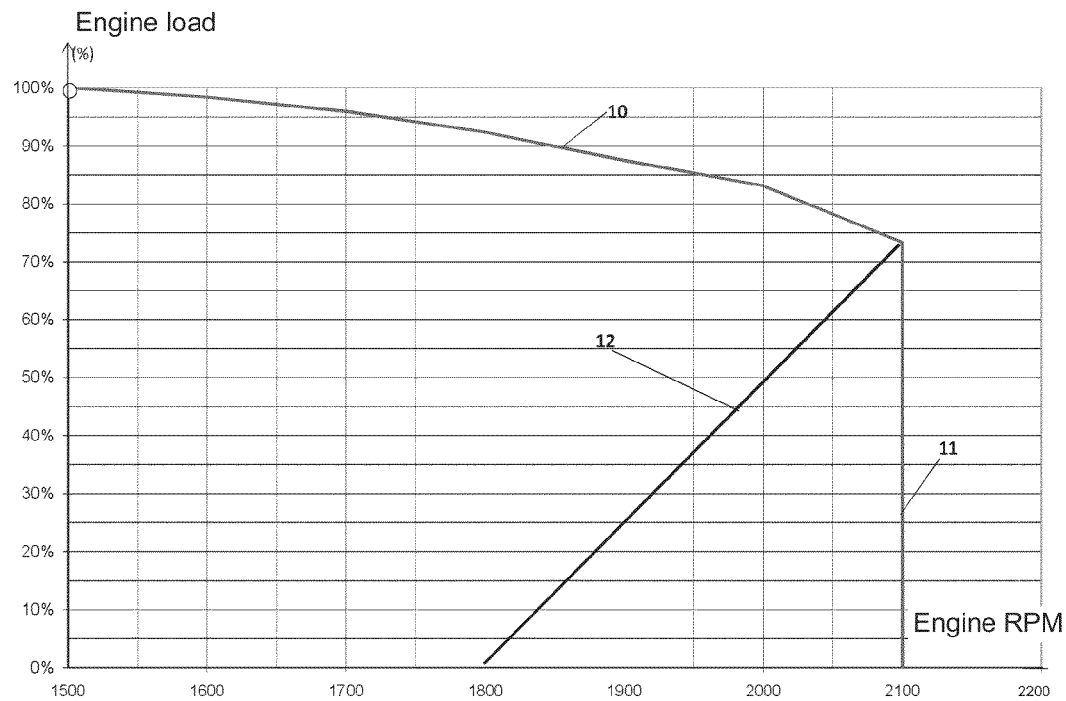
FIGS. 2 to 5 show different variants of control of the engine RPM as a function of load, compared with the existing control with fixed RPM (curve 11).

The RPM control described above is illustrated in FIGS. 2 to 6 and covers a number of possible embodiments of the present invention. Curve 10 in FIG. 2 is the engine torque curve showing the maximum available torque according to the current RPM, for example for the engine of a forage harvester. In this example the torque reaches its maximum value at 1500 RPM. The aforementioned torque range covers the area between the indicated values of 0% and 100%. The vertical 11 shows how RPM is controlled using the known method: the RPM is kept constant at a high value such as 2100 RPM. It then is the intention to operate the machine at this RPM under as many harvesting conditions as possible, in order to ensure that the cutting drums and blower are working properly. Only when the threshold load of +−73% has been exceeded (for example in the event of an increase of the travel speed, driving uphill), the speed will drop in accordance with engine torque curve 10. In the present context the word 'constant' does not mean that the actual RPM $n_i$ is at all times equal to a pre-determined value, but that the RPM is controlled with this constant value $n_s$ as the target value. In normal operation, the RPM will accordingly lie in a restricted sector around the target value.

Curve 12 in FIG. 2 shows a control according to the present invention. In the range between 0% and 73% the target RPM $n_s$ varies according to a continuously rising function of the engine torque from 1800 RPM to 2100 RPM. This function can be the linear function shown, but can also be some other rising function. This function is programmed into the control unit 6, ensuring that in the case of a change of the load in the range 0 to 73% the RPM assumes a value determined by the rising function. Above the 73% load, it is the engine torque curve which imposes the RPM.

Figure 3:
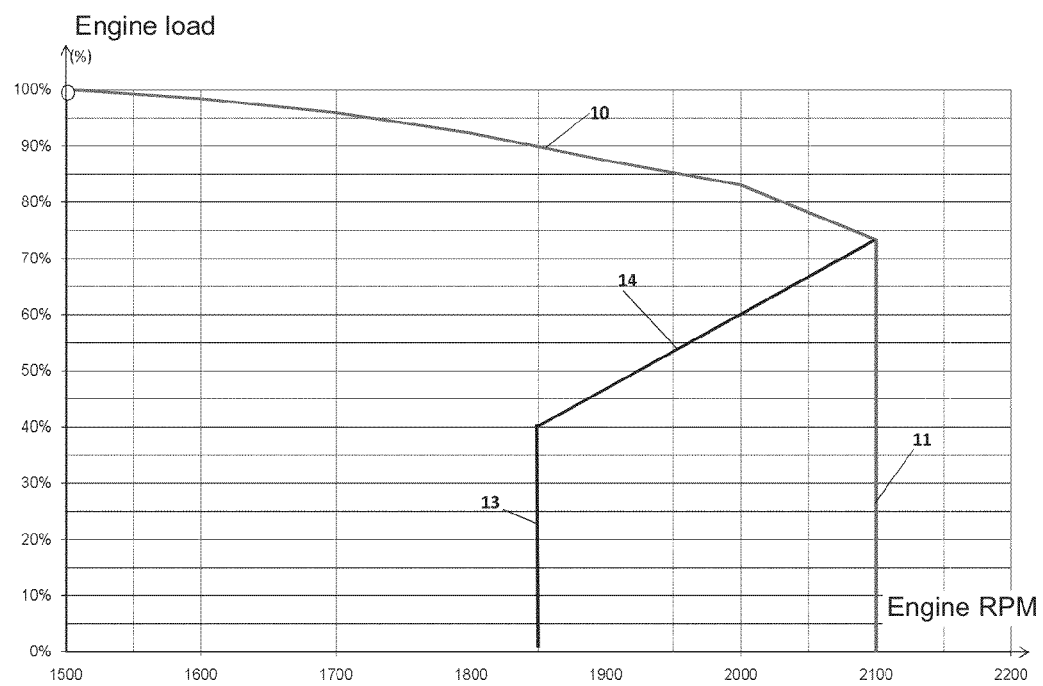

FIG. 3 shows another variant of the present invention, wherein the RPM is kept constant at a fixed target value of 1850 RPM in a first range 13 between a zero and a 43% load, and then in the sub-range 14 changes with the load according to a rising function up to the limit of 73%.

Figure 4:
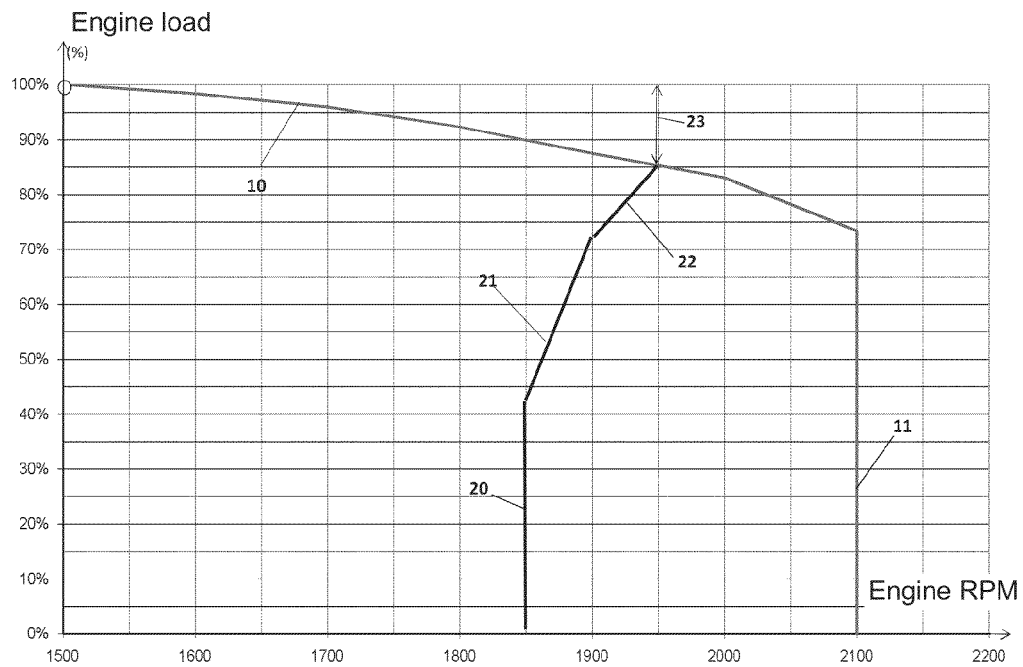
Figure 5:
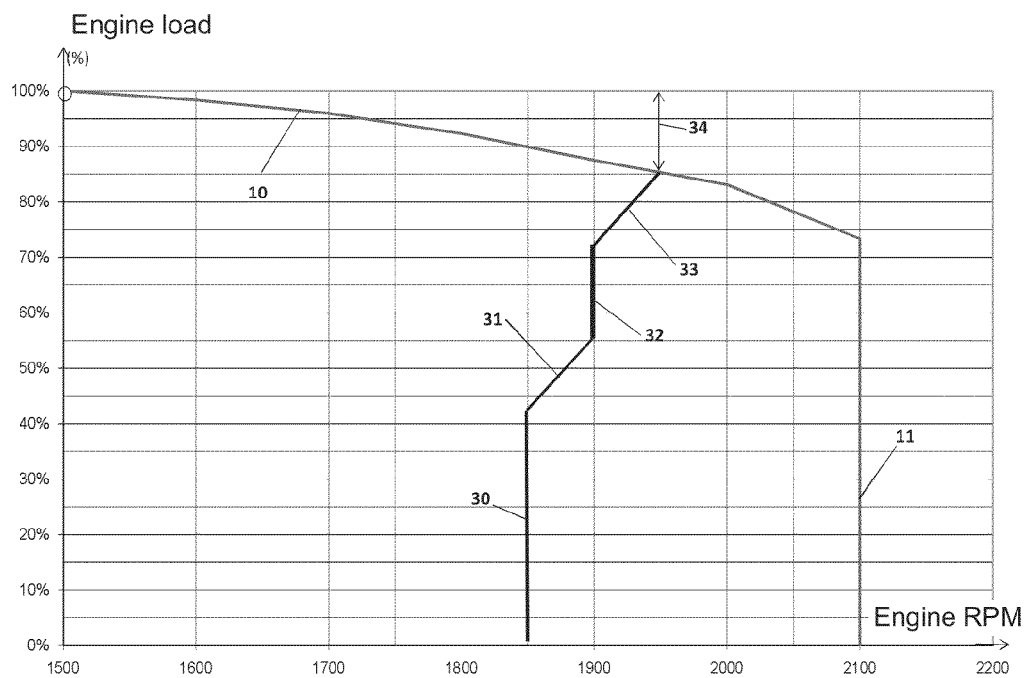

A specific embodiment of the present invention concerns a control wherein the range from a 0 to a 100% load is split into three sub-ranges, respectively corresponding to 'low', 'medium' and 'high' load as shown in FIGS. 4 and 5. FIG. 4 shows:
- a low load range 20: between a 0 and a 43% load with a constant target RPM ns of 1850 RPM;
- a medium load range 21: between 43% and 73% with a continuously rising target RPM;
- a transition zone 22: between 73% and 85% (from 1900 RPM) with a continuously rising target RPM (up to 1950 RPM); and
- a high load range 23, with an RPM according to engine torque curve 10.

FIG. 5 is an example of the embodiment of the present invention, wherein the control unit 6 is configured for controlling the engine RPM according to engine load in such a way that the RPM is kept constant in two or more non-overlapping sub-ranges of the engine torque range, according to whether the engine torque lies in a lower or a higher sub-range. In FIG. 5 one distinguishes:
- a low load range 30: between a 0 and a 43% load with a constant target RPM ns of 1850 RPM;
- a transition zone 31: between 43% and 55% with a continuously rising target RPM;
- a medium load range 32: between 55% and 73% with a continuously rising target RPM;
- a transition zone 33: between 73% and 85% (from 1900 RPM) with a continuously rising target RPM (up to 1950 rpm); and
- a high load range 34, with an RPM according to the engine torque curve.

In the context of the present invention the relation between the target RPM and power may comprise several constant RPM ranges in combination with several RPM ranges, in which the target RPM is a rising function of power. The present invention is characterised in that at least one sub-range is present where the imposed RPM is a rising function of the delivered torque or power as assessed (for example) in the ECU.

Figure 6:
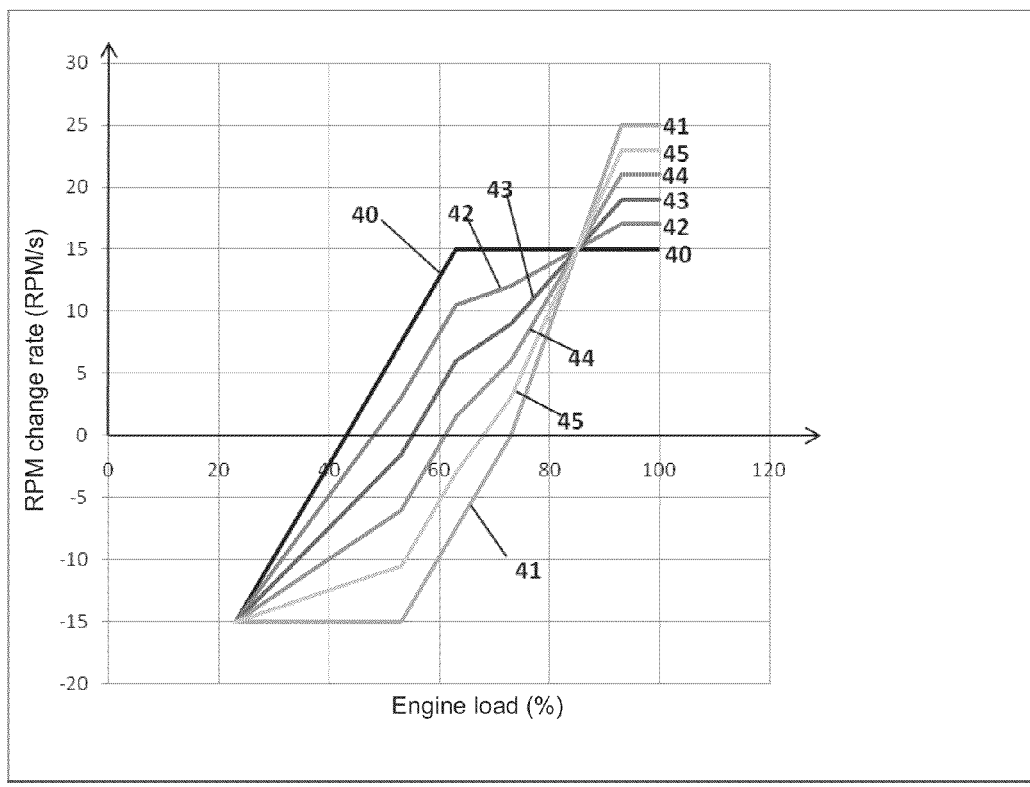
FIG. 6 shows a method of control of the engine RPM in a range where RPM is continuously rising with rising load.

According to the preferred embodiment of the present invention, the rate at which the target RPM changes within such a sub-range, is itself a rising function (at least over a portion of the sub-range) of the extent to which the imposed load respectively exceeds the sub-range upper limit or undershoots the sub-range lower limit. In other words, the higher the imposed engine torque, the more rapidly will the RPM will rise to the desired value of RPM and the lower the imposed engine torque, the more rapidly will the RPM fall to its desired value. A preferred embodiment of this type of control is shown in FIG. 6 relating to range 21 in FIG. 4. In range 21 the target RPM rises from 1850 RPM to 1900 RPM for a load of between 43% and 73%. FIG. 6 shows the rate at which the target RPM $n_s$ changes within range 21 according to the imposed load and the current engine RPM $n_i$. The reaction at a current RPM of 1850 RPM is shown in curve 40 and that at a current RPM of 1900 in curve 41. The portion of the curves above the x axis shows the rate of rise of the target RPM with the rise of the load, whilst the portion of the sector below the x axis shows the rate of the fall of the target RPM with the fall of the load. For example, the situation is considered in which the actual RPM $n_i$ is equal to 1850 RPM at a load $T_i$ of 20%. From this situation, the load rises suddenly to 60%. It follows from curve 40 that the target RPM rises at a rate of +−13 rpm/s. Nevertheless, from the moment the actual RPM $n_i$ rises, curve 40 is no longer decisive for the rise of RPM, but a curve located between curves 40 (corresponding to 1850 RPM) and 41 (corresponding to 1900 RPM). A possible position of the interpolated curves 42 to 45 corresponding to current RPM values of 1860, 1870, 1880 and 1890 RPM is shown in FIG. 6. According to these curves, the rate at which the RPM rises will consistently diminish until an RPM value is reached at which the corresponding curve intersects the x axis at the imposed load level of 60%. The current engine RPM $n_i$ then corresponds to the target RPM $n_s$ and the engine rotates at this RPM for as long as the load remains constant.

The curves 40 and 41 corresponding to the RPM interval (in the present case 1850 RMP to 1900 RPM), can be freely chosen by the programmer of the control unit. The interpolated curves 42 to 45 preferably follow automatically from the chosen boundary curves 40 and 41 according to a predetermined formula. The position of an interpolation curve belonging to a current RPM between 1850 RPM and 1900 RPM in the case of FIG. 6 is determined by the distance (expressed in RPM/s) between curves 40 and 41, by multiplying said distance by the percentage position of the RPM $n_i$ in the RPM interval between curves 40 and 41 and deducting the result from the value of curve 40. For example, with a 53% load:
- curve 40 (1850 RPM)→7.5 RPM/s
- curve 41 (1900 RPM)→−15 RPM/s
- distance between curves 40-41=22.5 RPM/s
- percentage RPM rise for 1860 RPM=10 RPM=20% of the interval 1850-1900 RPM
- →curve at 1860 RPM passes through (7.5−22.5)×20%=3 RPM/s By applying this formula to all points of the x axis and at 1860 RPM, 1870 RPM, 1880 RPM and 1890 RPM it is possible to generate the curves 42 to 45 shown in FIG. 6.

It can be seen that at a starting RPM of 1850 RPM and a rise from a 20% load to a higher load, it is possible to distinguish different possibilities, namely:
- with a rise to a load of between 43% and 73%, a rise to a target RPM between 1850 RPM and 1900 RPM, as described above;
- with a rise to a load of between 73% and +−85%, a rise from the target RPM with falling rate, to 1900 RPM and thereafter with constant rate further still to 1950 RPM (range 22, FIG. 4). The higher the load, the more rapidly will the target value of RPM rise from 1900 to 1950 RPM;
- with a rise to a load above +−85%, a rise of the target RPM at a rising rate to 1900 RPM and further at constant rate to 1950 RPM (range 22). The current RPM drops according to torque curve 10, but the target value remains 1950 RPM;
- with a rise to a load of +−85%, a rise from 1850 to 1950 RPM at a constant rate of 15 RPM/s.

What takes place when the target speed of 1900 RPM has been reached and when the load is rising further, is determined by the following control algorithm. In the case of FIG. 4, the control switches to a different mode (range 22) where the target RPM remains 1950 RPM. The progress of this value can be determined from the curves shown in FIG. 6. In another case, a switch takes place from 1900 RPM to a mode where the RPM is kept constant for a medium load (as shown in FIG. 5).

Control unit 6 retains the high target value of 1950 RPM for as long as the machine is working in the high load mode. In the case of FIG. 4, this is as long as the imposed load remains above 73% (ranges 22 and 23). As soon as the load falls below this value, the target RPM also falls, as shown in the lower half of the bundle of curves 40-45 in FIG. 6. With a load of between 43 and 73%, the target RPM becomes stabilised at a value between 1850 and 1900 RPM. With a lower load, the target RPM assumes a value of 1850 RPM. The greater the decrease of the load, the greater the commencing rate at which the target RPM falls. However, the rate of the decrease diminishes as the current RPM decreases.

As shown in FIG. 6, the curves 40 and 41 are limited to maximum rate values of 15 RPM/s, 25 RPM/s and −15 RPM/s (flat parts). It goes without saying that the form of curves 40-45 can vary within the context of the present invention. It is, for instance, possible to choose a control, which contains no intersection (as in the case of 85% load in FIG. 6), or where the curves 40 and 41 exhibit no flat portions.

In the control shown in FIG. 4 or 5 the high load mode is preferably operated with a current fixed engine RPM of 1900. This lies below the target RPM value of 1950 RPM, which is outputted by the control unit 6, because the load exceeds 85%. The current RPM falls along the engine torque curve 10. The control unit 6 can now automatically adjust the travel speed when the imposed load changes. This 'PowerCruise' mode described earlier is already known in the art. The transition zone 22 (FIG. 4) or 33 (FIG. 5) is a preliminary phase of the transition to PowerCruise mode for high load conditions. It is aimed for said transition zone to be traversed as rapidly as possible.

The machine preferably receives a default set value for the engine RPM, which can be adjusted by the operator. This concerns, for example, the set RPM of the PowerCruise mode. The control system of the present invention can be set around this set value; for example in the case of FIGS. 4 and 5, the set value is 1900 RPM. In case the set value is changed, the control curve automatically shifts along to higher or lower RPM values. In this way the operator can adjust the machine in the light of changing circumstances. Some crops require a greater speed of the processing elements, for example the blower. The operator can adjust said speed by modifying the set speed of the engine.

In a control module 6 according to the present invention the sub-ranges, the constant target values of engine RPM and the curves 40 and 41 (and interpolation curves) are pre-programmed in the module itself, using programming methods known in the art. Communication between the control module 6 and the engine 1 also takes place by known means.

The control unit 6 is accordingly configured for controlling the engine RPM using the following method:
  assessing the imposed engine load; and
  setting of the RPM in accordance with the imposed engine load and in accordance with a curve showing the target RPM as a function of the load, wherein said curve comprises at least one sub-range of the range between 0% and 100% of maximum load and in that the target RPM is a continuously rising function of the engine load.

The assessment of the imposed engine load preferably takes place by measuring fuel consumption and the current RPM, for example on the basis of a signal delivered by the ECU According to a preferred embodiment of the present method, the rate of change of the target RPM within said sub-range is itself a rising function of the extent to which the imposed load either respectively exceeds the sub-range upper limit or undershoots the sub-range lower limit, as described in relation to FIG. 6.

The curve can provide to keep the RPM equal to constant target values within two or more non-overlapping sub-ranges of said total load, the lowest sub-range beginning at 0% and wherein:

said constant target value is lowest for the lowest of said sub-ranges and rises for higher sub-ranges,
in the transition zone between the sub-ranges of constant target value the target RPM is a continuously rising function of the engine torque, as stated in claim 1.

According to an embodiment of the present invention, the difference between the target values of two neighbouring sub-ranges is constant.

According to an embodiment of the present invention, the method also comprises a step, in which the engine RPM is set corresponding to a sub-range with a constant target value, or an RPM between two zones with a continuously rising target RPM.

According to an embodiment, said curve comprises
  a low load range (20) where the target RPM retains a constant value;
  a medium load range (21) where the target RPM is a continuously rising function of the load;
  a high load range (23) where the current RPM is determined by the engine torque curve;
  a transition zone (22) between the medium and high load ranges, where the target RPM continuously rises to a maximum value.

According to another embodiment, said curve comprises:
  a low load range (30) where the target RPM retains a constant value;
  a medium load range (32) where the target RPM retains a constant value higher than the target value of the low load range,
  a high load range (34) where the actual RPM is determined by the engine torque curve;
  the transition zones (31, 33) between the low and the medium load ranges and between the medium and high load ranges, where the target RPM is a continuously rising function of the load.

The control method of the present invention has the advantage that the machine does not continuously rotate at a high RPM, but only switches to high RPM when the load requires it. This leads to a substantial fuel economy, as well as a reduction of machine noise generated. The control method where the RPM varies more rapidly the higher the imposed load modification, has the advantage that the machine changes more rapidly to a new value in the case of rapid changes of load and more slowly when said changes are gradual. In this way, the machine works in a flexible manner.

Said control method also enables a smooth changeover from manual control of the travel speed by the operator to an automatic speed control, keeping the machine load at a maximum. Both the control of the engine target RPM and the travel speed of the machine, make use of the measured load and of the current engine RPM.

The invention claimed is:
1. A self-propelled agricultural machine, comprising:
  elements for at least one of gathering and processing crops;
  an engine operable to travel the machine through a first driving mechanism and to drive the operation of said elements through a second driving mechanism; and
  a control unit for controlling engine RPM,
wherein the control unit is configured to control the engine RPM to reach or at least lie within a restricted sector around a target RPM, which is in turn based on an assessment of an imposed engine load, wherein the control unit is programmed in:
  a low load range to hold the target RPM at a constant target value;

at least one medium load range for the target RPM to be determined as a continuously rising function of the load; and a high load range to determine the RPM from a torque curve of the engine.

2. An agricultural machine according to claim 1, wherein the imposed engine load is derived from a measurement of the engine RPM and of fuel consumption.

3. An agricultural machine according to claim 1, wherein a current RPM and the imposed engine load are assessed and communicated by a second control unit.

4. An agricultural machine according to claim 1, wherein a rate of change of the target RPM within said medium load range is itself a rising function of the extent to which the imposed load either respectively exceeds the an upper limit of the medium load range or undershoots a lower limit of the medium load range.

5. An agricultural machine according to claim 1, wherein the at least one medium range comprises a lowest medium load range and a non-overlapping higher medium load range, the control unit is configured to keep an RPM equal to a constant target values within the medium load ranges, the lowest medium load range beginning at 0% of said range, and wherein:

said constant target value is lowest for the lowest of medium load range and rises for a higher medium load range, in a transition zone between the lowest and a higher medium load range of constant target value the target RPM is a continuously rising function of the engine load.

6. An agricultural machine according to claim 4, wherein a difference between constant target values of two neighbouring medium load ranges is constant.

7. An agricultural machine according to claim 1 wherein a machine operator sets engine RPM corresponding to a medium load range having a constant setting, or an RPM between two medium load ranges with a continuously rising target value.

8. An agricultural machine according to claim 1, the control unit is programmed further in:

a transition zone between the at least one medium load range and the high load range, where the control unit raises the target RPM continuously to a maximum value; and wherein in the high load range the control unit controls the target RPM at maximum value and the RPM of the engine is determined by the torque curve of said engine.

9. A method of controlling the RPM of a machine using at least one programmed control unit, the control unit is configured to perform the steps of:

assessing the imposed engine load; and controlling the engine RPM to reach or at least lie within a restricted sector around a target RPM, which is in turn based on an assessment of an imposed engine load, wherein the control unit is programmed in:

a low load range where the target RPM remains at a constant target value;

at least one medium load range where the target RPM is a continuously rising function of the load; and a high load range where the RPM is determined by the torque curve of the engine.

10. An agricultural machine according to claim 9, wherein a rate of change of the target RPM within said at least one medium load range is itself a rising function of the extent to which the imposed load respectively exceeds the at least one medium load range upper limit or undershoots the at least one medium load range lower limit.

* * * * *